(12) United States Patent
Tokita

(10) Patent No.: US 12,341,938 B2
(45) Date of Patent: Jun. 24, 2025

(54) IMAGE PROCESSING APPARATUS, CONTROL METHOD OF IMAGE PROCESSING APPARATUS, AND STORAGE MEDIUM

(71) Applicant: CANON KABUSHIKI KAISHA, Tokyo (JP)

(72) Inventor: Ken Tokita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/440,822

(22) Filed: Feb. 13, 2024

(65) Prior Publication Data

US 2024/0275896 A1 Aug. 15, 2024

(30) Foreign Application Priority Data

Feb. 15, 2023 (JP) ................. 2023-021396

(51) Int. Cl.
*H04N 1/00* (2006.01)
(52) U.S. Cl.
CPC ..... *H04N 1/00944* (2013.01); *H04N 1/00212* (2013.01); *H04N 1/00222* (2013.01); *H04N 1/00411* (2013.01); *H04N 2201/0012* (2013.01)
(58) Field of Classification Search
None
See application file for complete search history.

(56) References Cited

U.S. PATENT DOCUMENTS

| 2015/0264442 | A1* | 9/2015 | Fujimoto | ................ G06F 16/71 386/230 |
| 2019/0065842 | A1 | 2/2019 | Soga | |
| 2020/0344366 | A1* | 10/2020 | Omori | ................ H04N 1/00408 |

FOREIGN PATENT DOCUMENTS

| JP | 2007034647 A | 2/2007 |
| JP | 2007232920 A | 9/2007 |
| JP | 2013250758 A | 12/2013 |

* cited by examiner

*Primary Examiner* — Dov Popovici
(74) *Attorney, Agent, or Firm* — Canon U.S.A., Inc. IP Division

(57) ABSTRACT

An image processing apparatus equipped with a scanner has a function of transmitting image data generated using the scanner to a folder. The image processing apparatus displays a screen including a display area for displaying information indicating a transmission destination of the image data and an area for receiving an instruction to transmit the image data to the transmission destination. In a case where a folder path specified as the transmission destination and having folder names arranged in order from an upper hierarchy to a target folder does not fit within the display area, the folder path is displayed in the display area in a format in which a beginning part of the folder path is omitted.

16 Claims, 11 Drawing Sheets

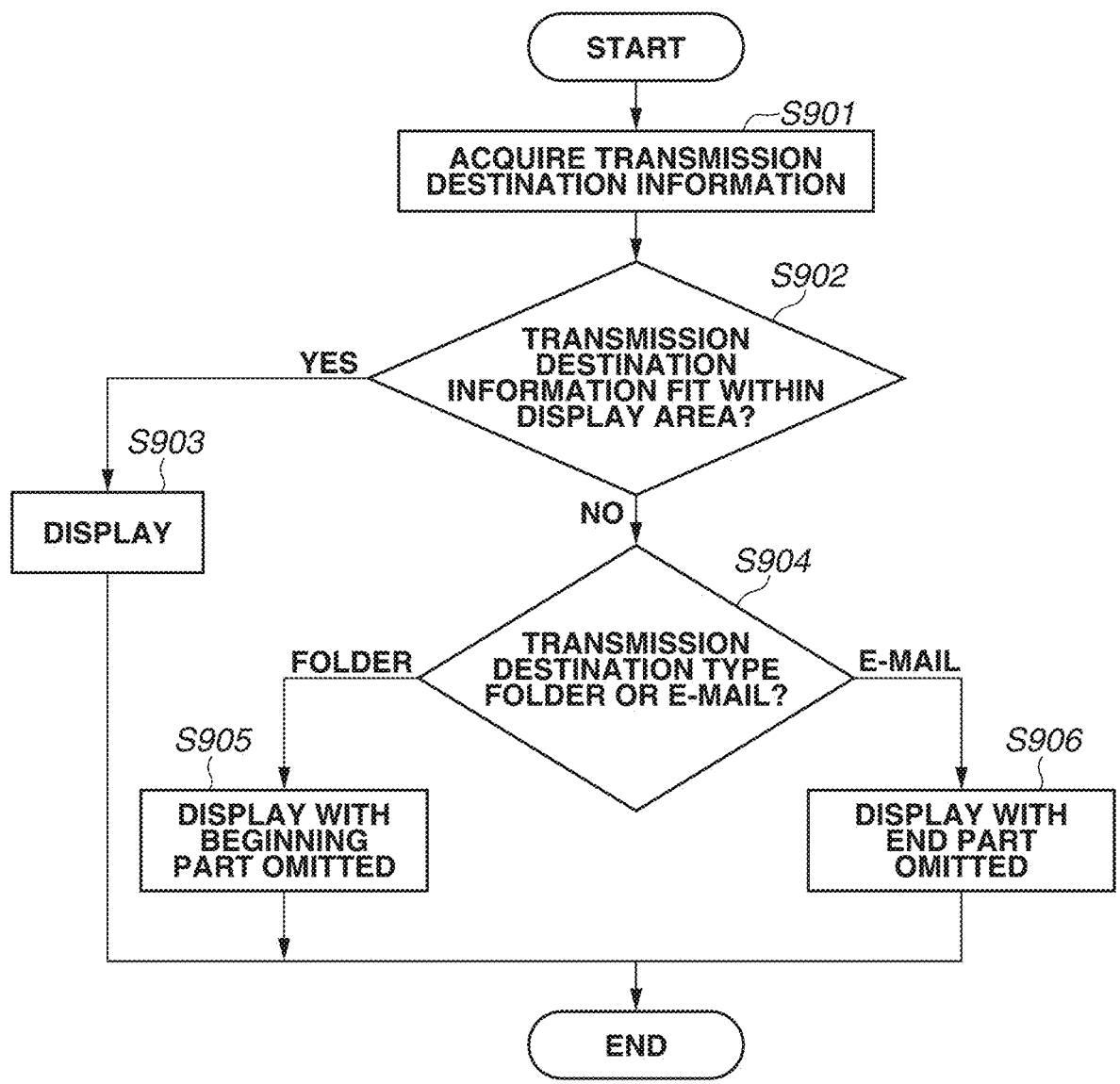

FIG.10

| TYPE | OMISSION PART |
|---|---|
| FOLDER | BEGINNING PART OMISSION |
| E-MAIL | END PART OMISSION |

1000

IMAGE PROCESSING APPARATUS, CONTROL METHOD OF IMAGE PROCESSING APPARATUS, AND STORAGE MEDIUM

BACKGROUND OF THE DISCLOSURE

Field of the Disclosure

The present disclosure relates to a technique for displaying information about a transmission destination to which image data is transmitted.

Description of the Related Art

Conventional information processing apparatuses, such as multifunction peripherals (MFPs), generally use a method for converting image data acquired by scanning a document, received facsimile data, or the like into a file and transmitting the file to a transmission destination service on a network. It is a common practice to display transmission destination information, such as a folder path and a file name, on a user interface (UI) screen at a time of transmitting filed data. In display of the transmission destination information, the transmission destination information may sometimes not fit within a predetermined area of a screen. For example, Japanese Patent Application Laid-Open No. 2013-250758 discusses a technique that displays, in a case where it is determined that the information does not fit within a display area, path information in the display area in reverse hierarchical order to display information at a deepest level at the top. Japanese Patent Application Laid-Open No. 2013-250758 also discusses a technique that omits a part of the path information and performs partial display of the path information.

There is a technique that converts acquired data into a file and transmits the file to various services on the network specified as transmission destinations. In this case, a type of address that can be specified as the transmission destination is different in accordance with the service. Specifically, a folder path is specified as the transmission destination for a storage service, and an e-mail address is specified as the transmission destination for an e-mail service. However, there is still an issue that, with regard to different types of transmission destinations, omitting different parts of the transmission destinations to perform partial display in a case where transmission destination information does not fit within a predetermined area in displaying the transmission destination information has not been discussed.

SUMMARY OF THE DISCLOSURE

The present disclosure is directed to performing display, with regard to different types of transmission destinations, such that different parts of the transmission destinations are omitted to perform partial display in a case where transmission destination information does not fit within a predetermined area in displaying the transmission destination information.

According to an aspect of the present disclosure, an image processing apparatus equipped with a scanner and having a function of transmitting image data generated using the scanner to a folder, the image processing apparatus includes a memory which stores a computer program, and at least one processor which executes the computer program to perform a process which includes displaying a screen including a display area for displaying information indicating a transmission destination of the image data and an area for receiving an instruction to transmit the image data to the transmission destination, and wherein, in a case where a folder path specified as the transmission destination and having folder names arranged in order from an upper hierarchy to a target folder does not fit within the display area, the folder path is displayed in the display area in a format in which a beginning part of the folder path is omitted.

Further features of the present disclosure will become apparent from the following description of exemplary embodiments with reference to the attached drawings.

BRIEF DESCRIPTION OF THE DRAWINGS

FIGS. 8A and 8B are diagrams illustrating examples of transmission destination selection screens.

FIG. 9 is a flowchart illustrating processing of partial display for transmission destination information in detail.

FIG. 10 is a diagram illustrating an example of an omission target management table.

DESCRIPTION OF THE EMBODIMENTS

Hereinafter, exemplary embodiments for carrying out the present disclosure will be described with reference to the drawings. The following exemplary embodiments are not intended to limit the present disclosure according to the appended claims, and not all combinations of features described in the exemplary embodiments are essential as means for solving the issues of the present disclosure.

<System Configuration>

Figure 1:
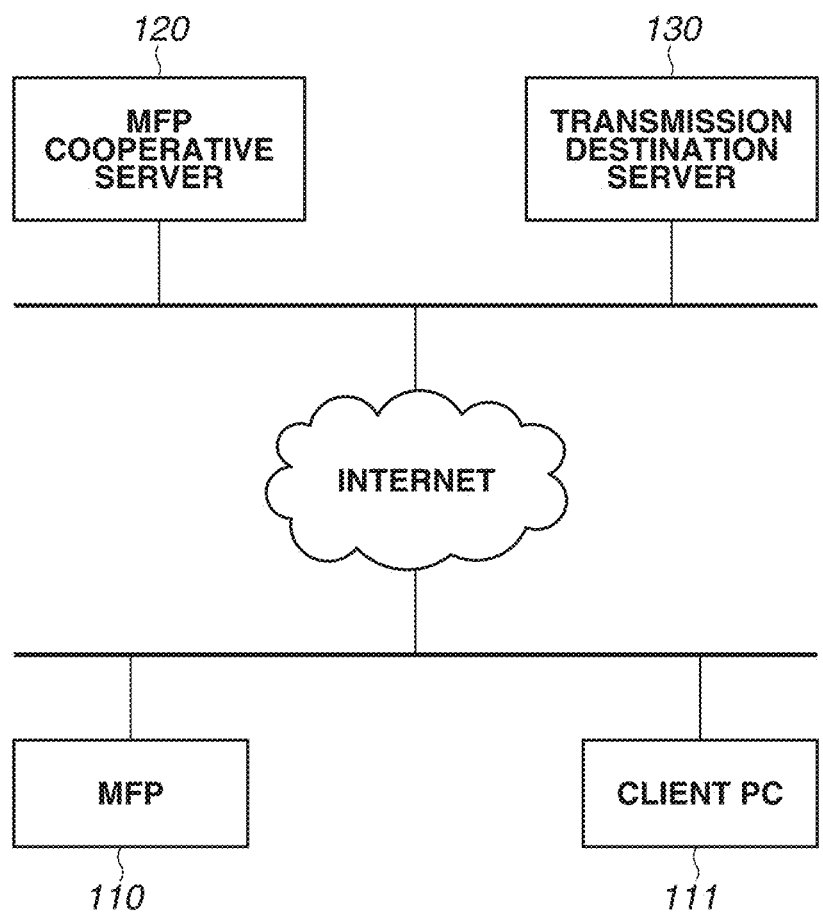
FIG. 1 illustrates an overall configuration of an image processing system.

FIG. 1 is a diagram illustrating an overall configuration of an information processing system according to an exemplary embodiment. The information processing system includes a multifunction peripheral (MFP) 110, a client personal computer (PC) 111, and server apparatuses 120 and 130 that provide cloud services on an Internet. The MFP 110 and the client PC 111 are connected via a local area network (LAN) to various apparatuses providing various services on the Internet to communicate with each other.

The MFP 110 is an example of an image processing apparatus having a scan function. The MFP 110 is a multifunction peripheral having a plurality of functions, such as a print function and a BOX storage function, in addition to the scan function. The client PC 111 is an information processing apparatus, such as a desktop terminal and a mobile terminal that can receive a cloud service via the Internet. The server apparatuses 120 and 130 are both information processing apparatuses providing cloud services. The server apparatus 120 according to the present exemplary embodiment provides a cloud service that performs image analysis on a scanned image received from the MFP 110 and transfers a request from the MFP 110 to the server apparatus 130 providing another service. Hereinbelow, the cloud service provided by the server apparatus 120 is referred to as an MFP cooperative service. The server apparatus 130 provides a cloud service or an e-mail service that stores file data transmitted via the Internet in a predetermined folder as a storage location and provides the stored file in response to a request from a web browser of the client PC 111. According to the present exemplary embodiment, the server apparatus 120 providing the MFP cooperative service is referred to as an MFP cooperative server, and the server apparatus 130 providing a transmission destination service is referred to as a transmission destination server.

The information processing system according to the present exemplary embodiment has a configuration including the MFP 110, the client PC 111, the MFP cooperative server 120, and the transmission destination server 130, but the configuration is not limited to this.

For example, the MFP 110 may also serve as the client PC 111 and the MFP cooperative server 120. The MFP cooperative server 120 may be on the LAN instead of on the Internet. The transmission destination server 130 may be replaced with an e-mail server or the like and applied to a case where a scanned image of a document is attached to an e-mail and transmitted.

<Hardware Configuration of MFP 110>

Figure 2:
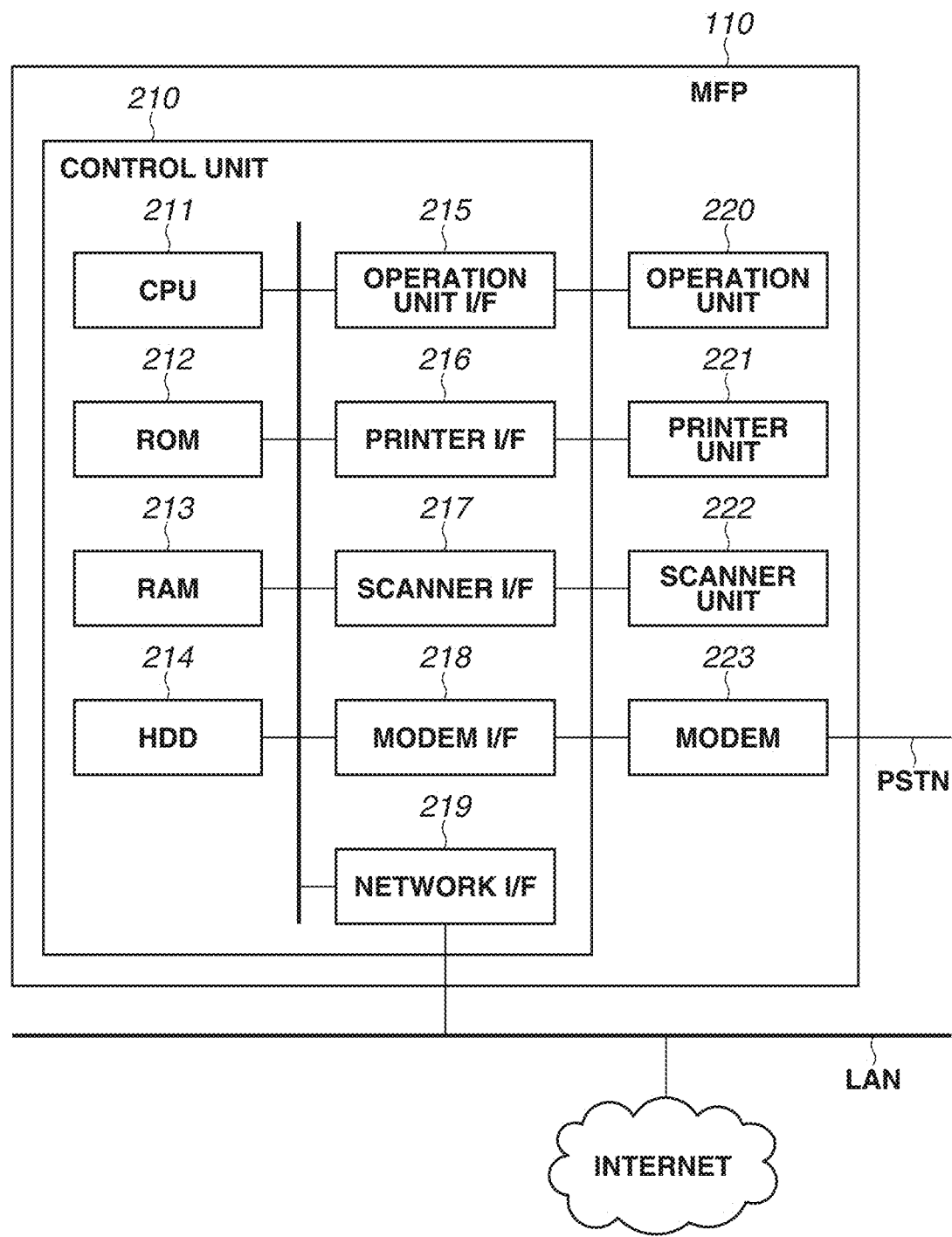
FIG. 2 is a block diagram illustrating a hardware configuration of a multifunction peripheral (MFP).

FIG. 2 is a block diagram illustrating a hardware configuration of the MFP 110. The MFP 110 includes a control unit 210, an operation unit 220, a printer unit 221, a scanner unit 222, and a modem 223. The control unit 210 includes components (211 to 219) described below and controls an overall operation of the MFP 110. A central processing unit (CPU) 211 reads and executes a control program (a program corresponding to various functions illustrated in a software configuration diagram described below) stored in a read-only memory (ROM) 212. A random access memory (RAM) 213 is used as a temporary storage area, such as a main memory, a work area, and the like, of the CPU 211. According to the present exemplary embodiment, one CPU 211 uses one memory (the RAM 213 or a hard disk drive (HDD) 214) to execute each processing illustrated in a flowchart described below, but the configuration is not limited to this. For example, each processing may be executed by a plurality of CPUs and a plurality of RAMs or HDDs working together.

The HDD 214 is a large-capacity storage unit that stores image data and various programs. An operation unit interface (I/F) 215 connects the operation unit 220 and the control unit 210. The operation unit 220 includes a touch panel, a keyboard, and the like and receives an operation, an input, and an instruction from a user. Touch operations on the touch panel include operations using a human finger and a touch pen. A printer I/F 216 connects the printer unit 221 and the control unit 210. Image data to be printed is transferred from the control unit 210 to the printer unit 221 via the printer I/F 216 and is printed on a recording medium.

A scanner I/F 217 connects the scanner unit 222 and the control unit 210. The scanner unit 222 reads a document set on a document platen (not illustrated) or an automatic document feeder (ADF), generates scanned image data, and inputs the scanned image data to the control unit 210 via the scanner I/F 217. The scanned image data generated by the scanner unit 222 can be printed by the printer unit 221 (copy output), stored in the HDD 214, and transmitted as a file or an e-mail to an external apparatus, such as the MFP cooperative server 120, via the LAN. A modem I/F 218 connects the modem 223 and the control unit 210. The modem 223 performs facsimile communication of image data with a facsimile apparatus (not illustrated) on a public switched telephone network (PSTN). In other words, the modem 223 can transmit and receive image data to and from an external facsimile apparatus. A network I/F 219 connects the control unit 210 (the MFP 110) to the LAN. The MFP 110 uses the network I/F 219 to transmit image data and information to each service on the Internet and receive various types of information from each service on the Internet. The hardware configuration of the MFP 110 described above is an example, and the MFP 110 may include a different component(s) or may not include one or some of the components as necessary.

<Hardware Configuration of Client PC and Server Apparatus>

Figure 3:
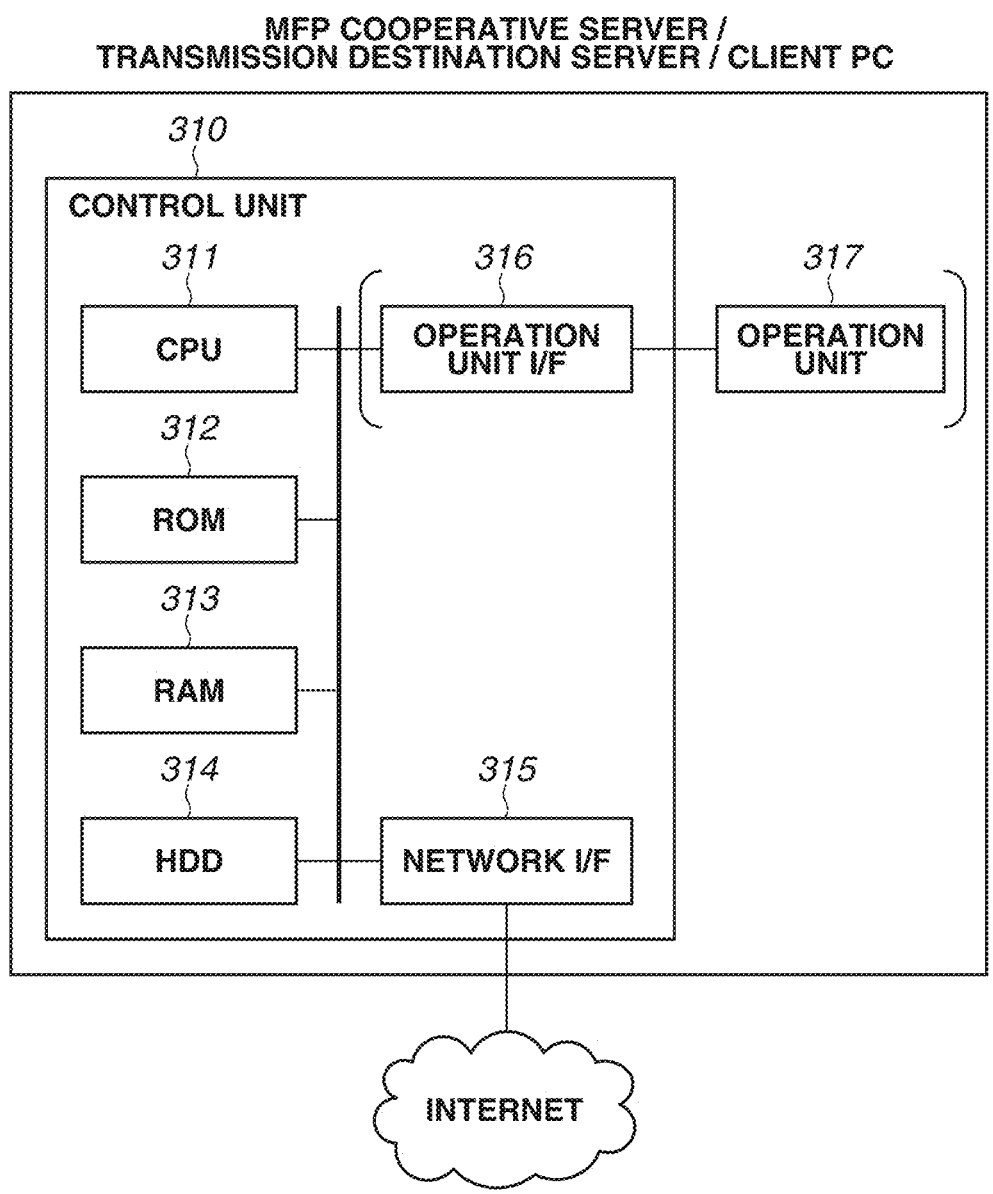
FIG. 3 is a block diagram illustrating a hardware configuration of an MFP cooperative server and a transmission destination server.

FIG. 3 is a block diagram illustrating a hardware configuration of the client PC 111, the MFP cooperative server 120, and the transmission destination server 130. The client PC 111, the MFP cooperative server 120, and the transmission destination server 130 each include a CPU 311, a ROM 312, a RAM 313, an HDD 314, a network I/F 315, and an operation unit I/F 316. The CPU 311 controls an overall operation by reading a control program stored in the ROM 312 and executing various types of processing. The RAM 313 is used as a temporary storage area, such as a main memory, a work area, and the like of the CPU 311. The HDD 314 is a large-capacity storage unit that stores image data and various programs. The network I/F 315 connects the client PC 111, the MFP cooperative server 120, and the transmission destination server 130 to the Internet.

The MFP cooperative server 120 and the transmission destination server 130 receive requests for various types of processing from other apparatuses including the MFP 110, the client PC 111, and the like, via the network I/F 315 and return processing results corresponding to the requests. The operation unit I/F 316 and an operation unit 317 are components disposed in the client PC 111. The operation unit I/F 316 connects the operation unit 317 and a control unit 310.

<Software Configuration of Information Processing System>

Figure 4:
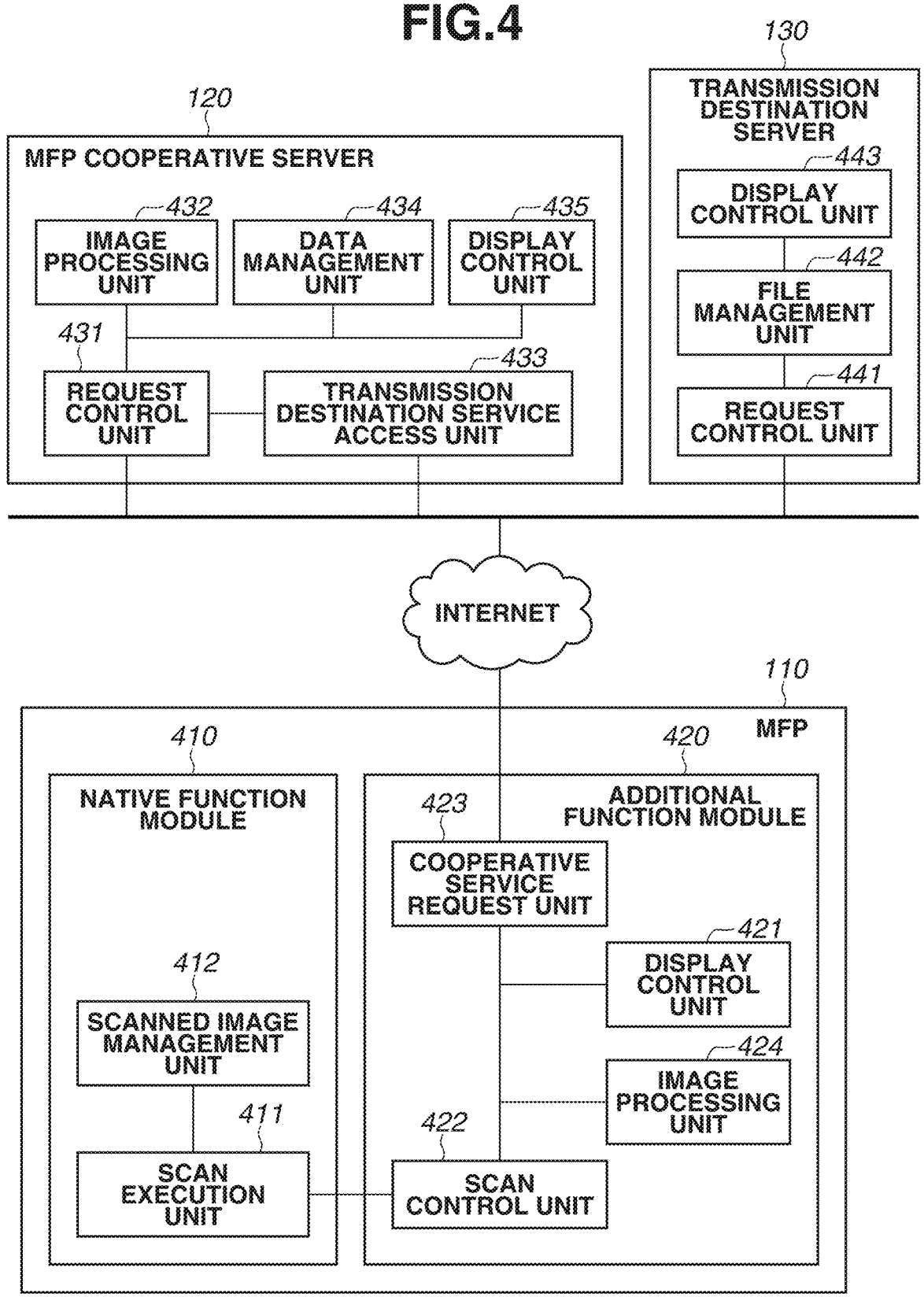
FIG. 4 is a block diagram illustrating a software configuration of the image processing system.

FIG. 4 is a block diagram illustrating a software configuration of the information processing system according to the present exemplary embodiment. The software configurations corresponding to respective roles of the MFP 110, the MFP cooperative server 120, and the transmission destination server 130 are described below in order. The following description focuses on a function, among various functions of each apparatus, related to processing for converting a scanned image acquired by scanning a document by the MFP 110 into a file and transmitting the scanned image to the transmission destination server 130 via the MFP cooperative server 120.

<<Software Configuration of MFP>>

Function modules of the MFP 110 can be classified roughly into two types, which are a native function module 410 and an additional function module 420. The native function module 410 is a standard application that has been included in the MFP 110, while the additional function module 420 is an application that has been additionally installed in the MFP 110. The additional function module 420 is an application based on Java® and can easily add functions to the MFP 110. The MFP 110 may have a different additional application(s) which has been installed but not illustrated.

The native function module 410 includes a scan execution unit 411 and a scanned image management unit 412. The additional function module 420 includes a display control unit 421, a scan control unit 422, a cooperative service request unit 423, and an image processing unit 424.

The display control unit 421 displays a user interface (UI) screen to receive various user operations performed on the touch panel of the operation unit 220. The various user operations include, for example, an input of login authentication information for access to the MFP cooperative server 120, a setting related to scan, a setting related to a transmission destination of image data acquired by scanning, an instruction to start scan, and an instruction to store or transmit a file. The setting related to the transmission destination includes selection of a transmission destination server to store the image data acquired by scanning to the transmission destination service or transmit the image data by an e-mail, and settings related to folder sorting and file naming.

In response to a user operation performed on the UI screen (for example, pressing of a scan start button), the scan control unit 422 issues an instruction to the scan execution unit 411 to execute scan processing together with scan setting information. The scan execution unit 411 causes the scanner unit 222 to perform a document reading operation via the scanner I/F 217 according to the instruction to execute scan processing from the scan control unit 422 and generates scanned image data. The generated scanned image data is stored in the HDD 214 by the scanned image management unit 412. In this operation, information of a scanned image identifier that uniquely indicates the stored scanned image data is notified to the scan control unit 422. The scanned image identifier is a number, a symbol, an alphabet, or the like, which is used to uniquely identify an image scanned by the MFP 110. The scan control unit 422 acquires, for example, the scanned image data to be converted into a file from the scanned image management unit 412 by using the scanned image identifier described above. Then, the scan control unit 422 instructs the cooperative service request unit 423 to issue a request to instruct the MFP cooperative server 120 to perform necessary processing to generate the file.

The cooperative service request unit 423 issues a request to instruct the MFP cooperative server 120 to perform various types of processing and receives responses. The various types of processing include, for example, login authentication, analysis of the scanned image, and transmission of the scanned image data. Communication protocols, such as representational state transfer (REST) and a Simple Object Access Protocol (SOAP) are used to communicate with the MFP cooperative server 120.

The image processing unit 424 performs predetermined image processing on the scanned image data and generates an attribute that includes the transmission destination and a file name and is to be used on the UI screen displayed by the display control unit 421.

<<Software Configuration of Server Apparatus>>

First, the software configuration of the MFP cooperative server 120 is described. The MFP cooperative server 120 includes a request control unit 431, an image processing unit 432, a transmission destination service access unit 433, a data management unit 434, and a display control unit 435. The request control unit 431 waits to receive a request from an external apparatus and instructs the image processing unit 432, the transmission destination service access unit 433, and the data management unit 434 to perform predetermined processing according to a content of a received request. The image processing unit 432 performs image processing, such as rotation and tilt correction, on the scanned image data transmitted from the MFP 110. The transmission destination service access unit 433 requests the transmission destination server 130 to perform processing. The cloud service has publicly available various interfaces to store a file in the transmission destination service and acquire the stored file from the transmission destination service by using protocols, such as REST and SOAP. The transmission destination service access unit 433 uses the publicly available interface to issue a request and transmit an e-mail to the transmission destination server 130. The data management unit 434 stores and manages user information, various setting data, and the like managed by the MFP cooperative server 120. The display control unit 435 receives a request from the web browser running on the MFP 110 or the client PC 111 connected via the Internet and returns screen configuration information (HyperText Markup Language (HTML), Cascading Style Sheets (CSS), and the like) to be used for screen display. A user can check the registered user information and change rule settings related to the scan setting, the folder sorting, and the file naming via a screen displayed on the web browser.

Next, the software configuration of the transmission destination server 130 is described. The transmission destination server 130 includes a request control unit 441, a file management unit 442, and a display control unit 443. The request control unit 441 waits to receive a request from an external apparatus and, according to the present exemplary embodiment, instructs the file management unit 442 to store a received file and to read the stored file in response to a request from the MFP cooperative server 120. Then, the request control unit 441 returns a response corresponding to the request to the MFP cooperative server 120. The display control unit 443 receives a request from the web browser running on the MFP 110 or the client PC 111 connected via the Internet and returns screen configuration information (HTML, CSS, and the like) to be used for screen display. A user can check and acquire the stored file via the screen displayed on the web browser.

The client PC 111, while it is not illustrated in FIG. 4, also includes the same function modules as those of the above-described additional function module 420.

<Scan Profile>

A file naming rule setting can be set on a workflow basis of various scan workflows. Here, the scan workflow refers to a workflow that is for transmission of scanned image data acquired by scanning a document, such as a form, to a specific transmission destination (for example, the transmission destination server 130) under a specific condition. The condition and transmission destination information of each scan workflow are managed by a scan profile. A scan profile has been created in advance, so that a user can easily execute desired scan workflow.

Figure 5:
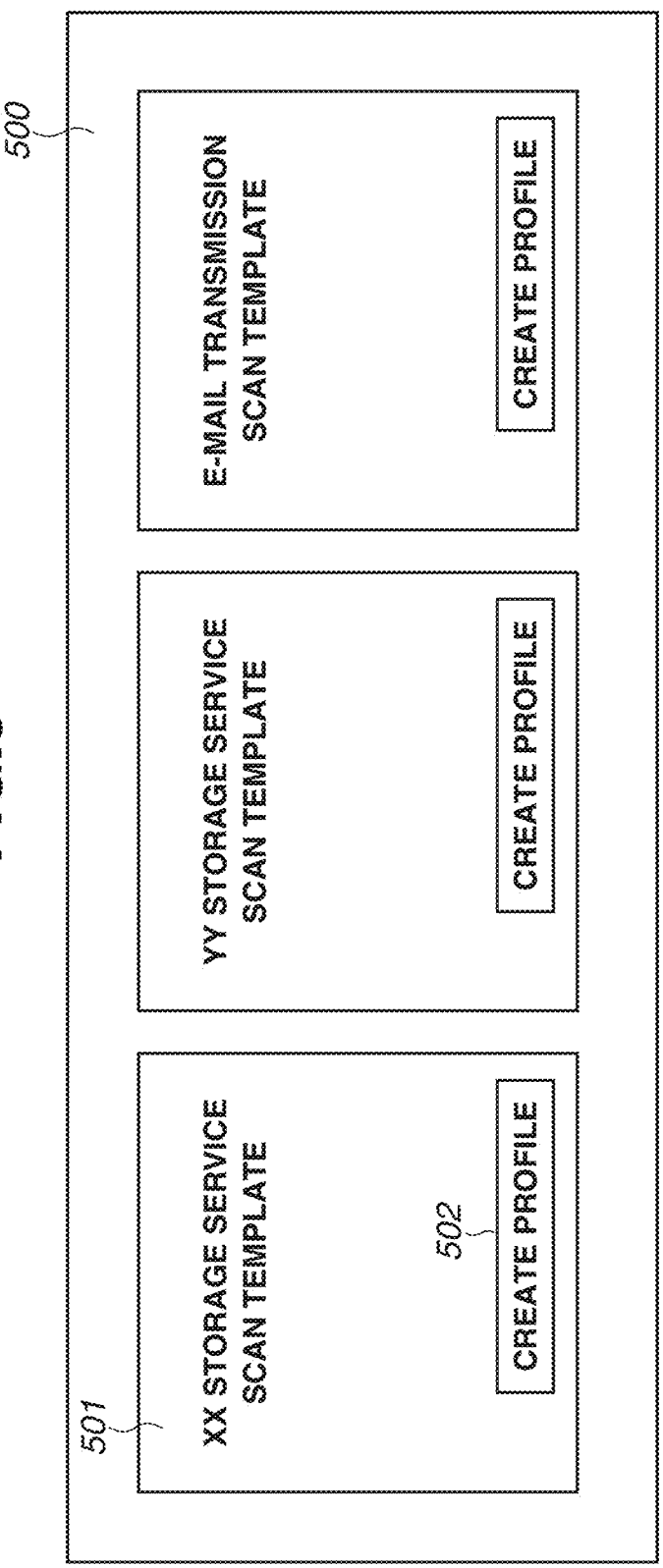
FIG. 5 is a diagram illustrating an example of a scan template list screen.

A method for creating a scan profile is described. For example, the user logs in to the MFP cooperative server 120 via the client PC 111 and can display a UI screen as illustrated in FIG. 5 by shifting a screen from a main screen (not illustrated) that is displayed after the log in. FIG. 5 illustrates an example of a UI screen (hereinbelow, referred to as a template selection screen) that is displayed on the operation unit 317 of the client PC 111 and displays a list of templates to be used for creation of the scan profile. A template selection screen 500 displays templates 501. The templates 501 may be prepared on a use case basis, on an industry and operation basis, or on a transmission destination service basis. Alternatively, a user may be able to customize all settings without using a template and create a profile.

Next, in a case where a user presses a CREATE PROFILE button 502, a scan profile setting screen (not illustrated) is displayed. On the scan profile setting screen, workflow settings, such as a type of the transmission destination service of the transmission destination, namely a transmission destination type, and an output file type, can be performed. A default transmission destination can also be set. For example, in a case of an "xx storage service scan template", an "xx storage service" is set as the transmission destination service, a "folder" is set as the transmission destination type, and a predetermined folder in the storage service is set as a setting of the default transmission destination. In a case of an "e-mail transmission scan template", an "e-mail service" is set as the transmission destination service, an "e-mail address" is set as the transmission destination type, and a predetermined e-mail address can be set as a setting of the default transmission destination. The transmission destination type may be set by the user, or the MFP cooperative server 120 may automatically set a type corresponding to the transmission destination service selected by the user.

Figure 6:
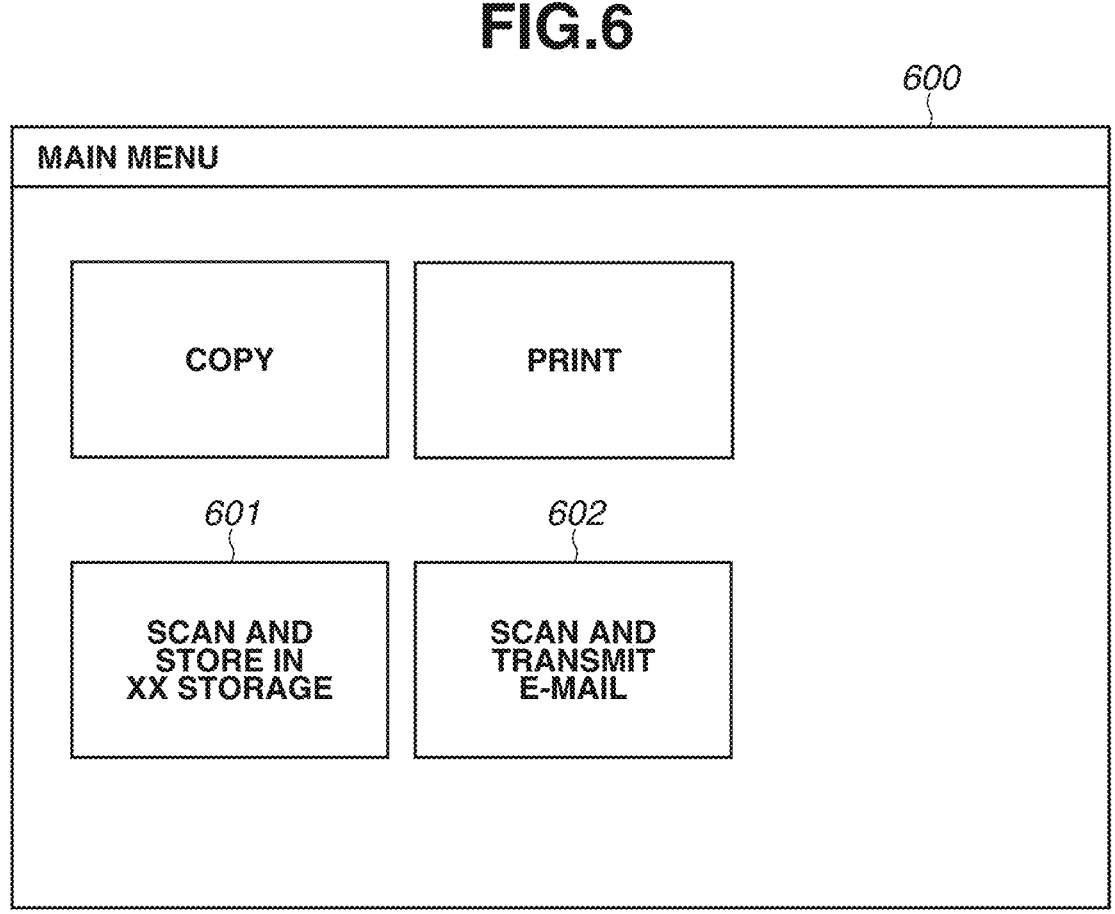
FIG. 6 is a diagram illustrating an example of a scan profile execution screen.

After the user has completed all settings and presses a "store" button (not illustrated) on the scan profile setting screen, the scan profile is created. The created profile is displayed on the operation unit 220 of the MFP 110 as illustrated in FIG. 6.

<Scan Profile Execution Procedure>

Figure 11:
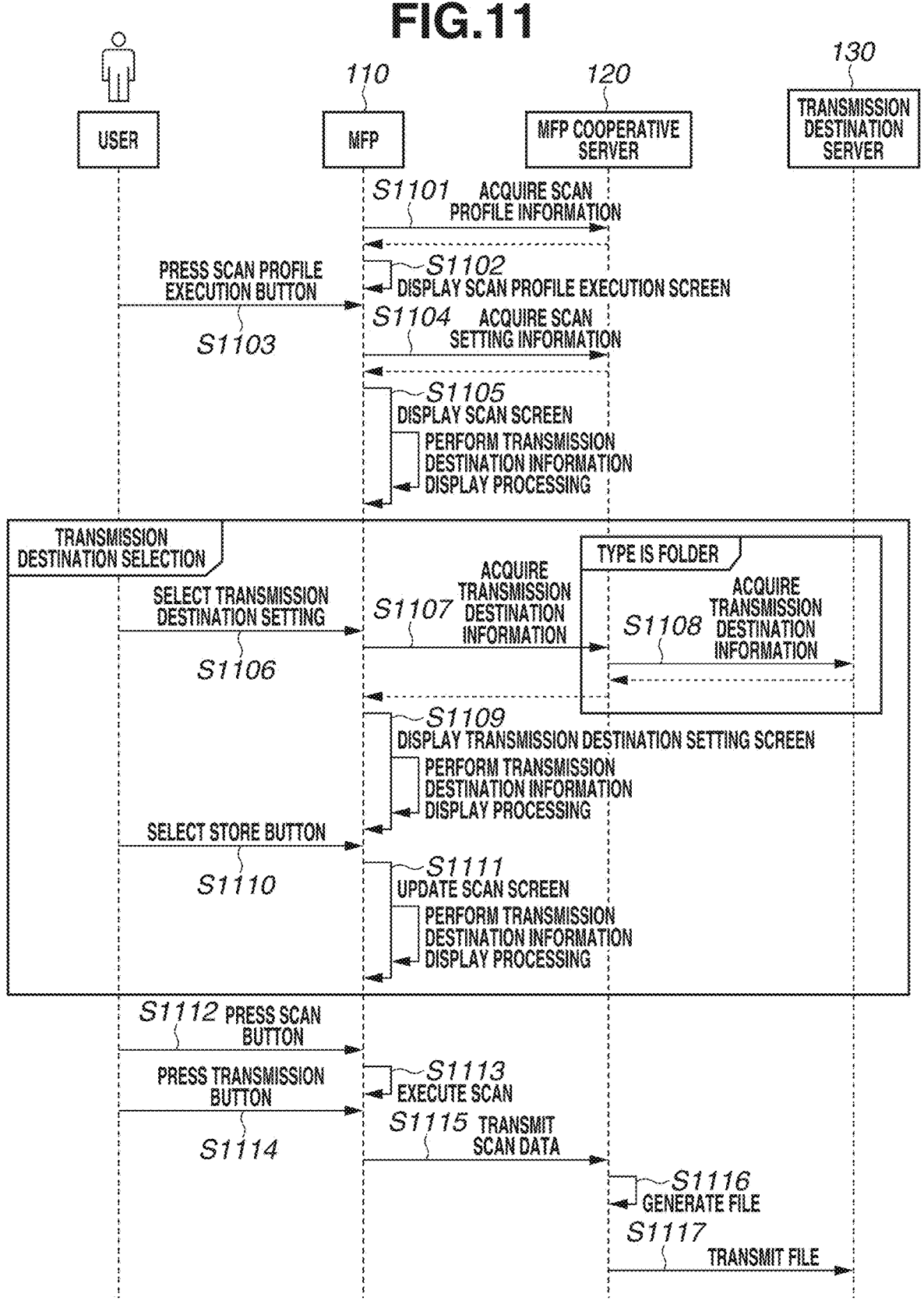
FIG. 11 is a sequence diagram illustrating a processing procedure among apparatuses.

FIG. 11 is a sequence diagram illustrating a procedure of processing that is performed among each apparatus in a case where the scan profile is executed in the MFP 110 and the scanned image is converted into a file and transmitted to the transmission destination server. A sequence of the procedure is started when the user displays a home screen on the MFP 110. While, in FIG. 11, the MFP 110 communicates with the MFP cooperative server 120, screen display described below may be executed by the client PC 111 instead of the MFP 110.

In step S1101, the display control unit 421 of the MFP 110 acquires scan profile information from the MFP cooperative server 120 to display the home screen. The MFP cooperative server 120 transmits the scan profile information that has been created in the template selection screen 500 in FIG. 5, to the MFP 110. In step S1102, the MFP 110 displays the home screen with a scan profile execution button, based on the acquired scan profile information. In this process, to display the scan profile execution button on the home screen of the MFP 110, the MFP 110 installs thereon an additional application for transmitting a scan file to the transmission destination server. A screen 600 illustrated in FIG. 6 is the home screen.

<<Scan Profile Execution Screen>>

FIG. 6 illustrates an example of a screen via which the created scan profile is executed. According to the present exemplary embodiment, the screen 600 is the home screen that displays an application to be executed by the MFP 110. On the same screen displaying a copy application and a print application, a SCAN AND STORE IN XX STORAGE button 601 and a SCAN AND TRANSMIT E-MAIL button 602 are displayed as the scan profile execution buttons. The buttons 601 and 602 are used for execution of the profile created from the above-described template illustrated in FIG. 5. The SCAN AND STORE IN XX STORAGE button 601 is used for execution of the profile created by the user pressing the CREATE PROFILE button 502 in the template 501 of "xx storage service scan template". In other words, the SCAN AND STORE IN XX STORAGE button 601 is a button associated with XX STORAGE. The SCAN AND TRANSMIT E-MAIL button 602 is used for execution of the profile created by the user pressing the create profile button in the e-mail transmission scan template displayed on the template selection screen 500. In response to the display control unit 421 detecting that the user has pressed the scan profile execution button, i.e., the button 601 or the button 602, on the screen 600 of the MFP 110, the scan profile corresponding to the pressed button is executed. In step S1103, the display control unit 421 detects that the user has pressed the scan profile execution button. In step S1104, the MFP 110 acquires the scan setting information and transmission destination information stored in the scan profile corresponding to the pressed button from the MFP cooperative server 120. The transmission destination information to be acquired includes the transmission destination service, the transmission destination type, and default transmission destination information that have been set at the time of creating the scan profile. In the present exemplary embodiment, the information acquired in step S1104 may be acquired for all created profiles at the time of acquiring the scan profile information in step S1102. Then, in step S1104, the display control unit 421 may extract and acquire information corresponding to the profile selected in step S1103 from among the information acquired in step S1102. In step S1105, the MFP 110 displays a scan screen.

<<Scan Screen>>

Figure 7A:
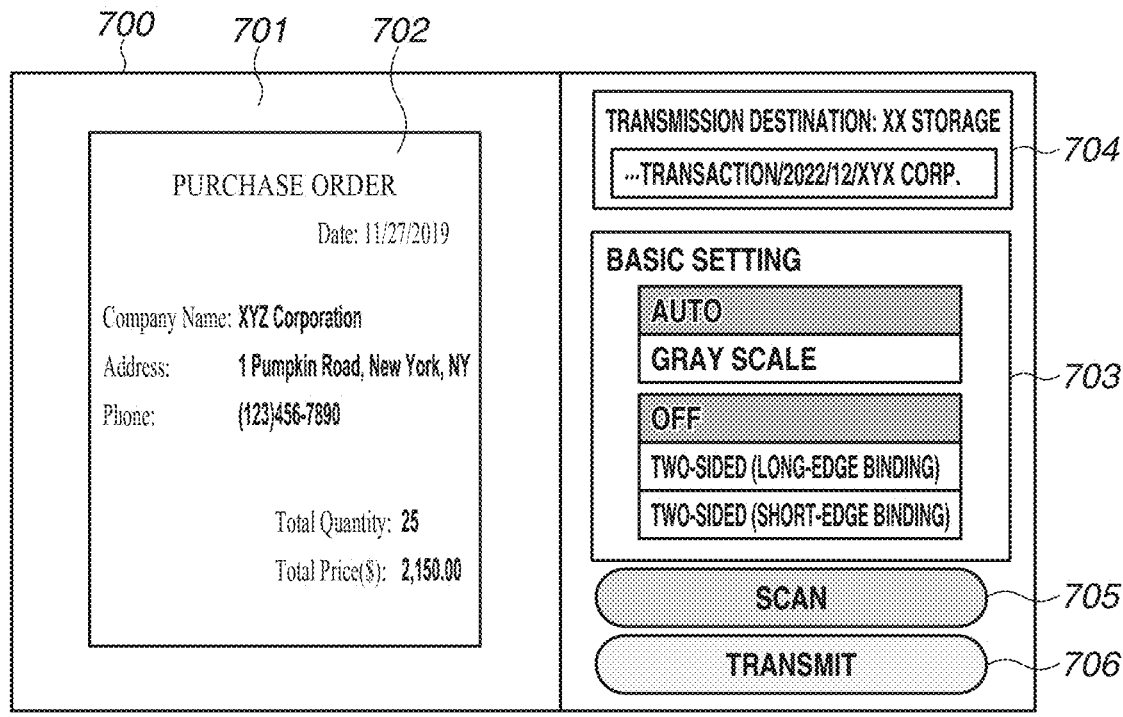
FIGS. 7A and 7B are diagrams illustrating examples of a scan screen.
Figure 7B:
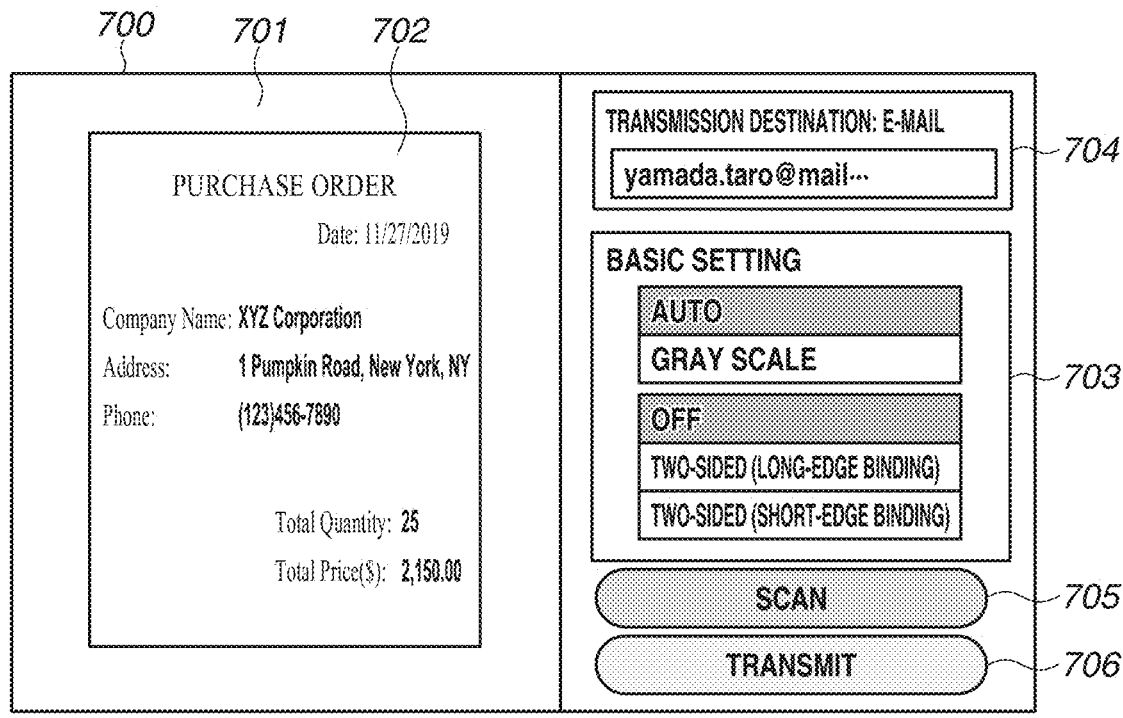

FIGS. 7A and 7B illustrate examples of a scan screen 700 displayed on the operation unit 220 of the MFP 110. Detecting that the user has pressed the scan profile execution button i.e., the button 601 or the button 602, the display control unit 421 displays the scan screen 700. The scan screen 700 includes a preview area 701, a scan setting 703, a transmission destination setting 704, a scan button 705, and a transmission button 706. Although not illustrated in FIG. 11, detecting that the scan profile execution button has been pressed, the display control unit 421 may instruct the scan execution unit 411 to execute scan using the scanner unit 222. Alternatively, regardless of whether the scan profile execution button is pressed, the scan may not be executed until the scan button 705 is pressed.

The preview area 701 displays a preview image 702 of a scanned document in preview. In a case where there is no scanned document, an image or a text (both not illustrated) may be displayed to prompt the user to scan. The scan setting 703 displays settings for scanning a document, such as color mode and two-sided settings. These settings are initially displayed based on the scan setting information acquired in step S1104. The transmission destination information for transmission of image data acquired by scanning can be set in the transmission destination setting 704. In the transmission destination setting 704 illustrated in FIG. 7A, "xx storage" and " . . . transaction/2022/12/xyx corp." are displayed as the transmission destination server and a transmission destination folder path, respectively. This is the display of a case where the user has pressed the SCAN AND STORE IN XX STORAGE button 601 in step S1103. This is also the display of a case where the default transmission destination has been set to " . . . /xx department/document/transaction/2022/12/xyx corp." in the creation of the scan profile in FIG. 5 described above. In step S1104, the default transmission destination information is acquired together with the scan setting information, and the transmission destination is displayed in the transmission destination setting 704 based on the information. The transmission destination setting 704 may display not only the transmission destination folder path, but also the transmission destination information, such as a file name and metadata. A directory path or a uniform resource identifier (URI) may be displayed instead of a folder path. In a case where the transmission destination server is an e-mail server, an e-mail address is displayed instead of the folder path as illustrated in the transmission destination setting 704 illustrated in FIG. 7B. In the present exemplary embodiment, a transmission destination e-mail address is displayed in a case where the user presses the SCAN AND TRANSMIT E-MAIL button 602 in step S1103. In a case where the default transmission destination has been set on the above-described scan profile setting screen (not illustrated), the set transmission destination information is initially displayed in the transmission destination setting 704. The transmission destination setting 704 is configured, in a case where the transmission destination has not been set, to initially display a blank field. In a case where the display control unit 421 determines that a character string of the transmission destination information does not fit within a display area of the transmission destination setting 704, the display control unit 421 omits a part of the character string and performs partial display of the transmission destination information. Processing of partial display is described in detail in FIG. 9. In response to the transmission destination setting 704 being pressed, a transmission destination setting screen 800 described below is displayed. The scan button 705 is used for execution of a scan. The transmission button 706 is used for transmission of scan data to the transmission destination server.

Back to the description of the sequence diagram. In step S1106, in response the display control unit 421 detecting that the user has pressed the transmission destination setting 704, then in step S1107, the display control unit 421 acquires the transmission destination information to which image data can be transmitted from the MFP cooperative server 120. For example, in a case where the SCAN AND STORE IN XX STORAGE button 601 has been selected on the screen 600, the transmission destination type set in the corresponding scan profile, namely the type, is FOLDER, so that the processing proceeds to step S1108. Then, the MFP cooperative server 120 acquires information about a folder from the transmission destination server 130. For example, whether a folder is currently selected is checked, and a list of subordinate folders is acquired. In step S1109, the MFP 110 displays the transmission destination setting screen 800. In a case where the user has selected the SCAN AND TRANSMIT E-MAIL button 602 on the screen 600, the type of the transmission destination set to the corresponding scan profile is E-MAIL. Thus, the MFP cooperative server 120 transmits to the MFP 110 a list of transmission destination e-mail addresses to which the MFP 110 can transmit an e-mail. The display control unit 421 of the MFP 110 receives the list, the processing processes to step S1109, and displays the transmission destination setting screen 800.

<<Transmission Destination Setting Screen>>

Figure 8A:

FIG. 8A is an example of the transmission destination setting screen 800 displayed on the operation unit 220 of the MFP 110. The transmission destination setting screen 800 displays an option that can be specified as the transmission destination. In response to the display control unit 421 detecting that the user has pressed the transmission destination setting 704, the display control unit 421 displays the transmission destination setting screen 800. The transmission destination setting screen 800 includes a selected transmission destination display area 801, a transmission destination selection area 802, a STORE button 805, and a RETURN button 806.

In the selected transmission destination display area 801, a currently selected type of the transmission destination service and a transmission destination are displayed. In the present exemplary embodiment, the selected transmission destination display area 801 indicates a state in which a folder path " . . . /xx department/document/transaction/2022/12/XYZ Corp." of the xx service is selected. In a case where a character string that is displayed in the selected transmission destination display area 801 does not fit within the display area, a part of the character string is omitted and partial display of the transmission destination is performed. A method of partial display is described in detail with reference to FIG. 9. The transmission destination selection area 802 is an area in which the transmission destination information is set. In the present exemplary embodiment, a cloud storage, which is xx service, is specified as the type of the transmission destination service, so that folder selection control is displayed, which means that a QUOTE folder 803 immediately below the currently selected folder " . . . /xx department/document/transaction/2022/12/XYZ Corp." is displayed. In a case where the QUOTE folder 803 is selected, the display in the transmission destination selection area 802 is changed to a list of folders immediately below the QUOTE folder 803, and the transmission destination information in the selected transmission destination display area 801 is also updated. In a case where a RETURN button 804 is selected, the display is changed to one level higher, that is a list of folders immediately below a "12" folder, and the transmission destination information in the selected transmission destination display area 801 is also updated. In a case where "e-mail transmission" is selected as the type of the transmission destination service, control (not illustrated) to which an e-mail address can be input is displayed. Further, the transmission destination setting screen 800 may be configured to be able to set attribute information, such as a file name and metadata (not illustrated). In a case where the STORE button 805 is pressed, the setting is stored, and the screen returns to the scan screen. In a case where the RETURN button 806 is pressed, the setting is not stored, and the screen returns to the scan screen.

The transmission destination setting screen 800 is not limited to the configuration illustrated in FIG. 8A. For example, FIG. 8B is another example of the transmission destination setting screen 800 displayed on the operation unit 220 of the MFP 110. This screen is displayed in response to the transmission destination setting 704 being pressed. In the transmission destination setting screen 800, a transmission destination type selection area 807 and a history selection area 808 are displayed additionally on the screen in FIG. 8A.

In the transmission destination type selection area 807, the transmission destination type can be selected. In a case illustrated in FIG. 8B in the present exemplary embodiment, "xx service transmission" and "e-mail transmission" are displayed, and the "xx service transmission" is selected. The "xx service transmission" is transmission to one of cloud storages. In the transmission destination type selection area 807, the transmission destination type that can be set is not limited, and various cloud storages, e-mail services, local servers, and the like can be set. In the history selection area 808, a list of transmission destination information to which transmission has been performed is displayed. In a case where a character string that is displayed in the history selection area 808 does not fit within the display area, a part of the character string is omitted and the partial display of the character string is performed. The method of partial display is described in detail with reference to FIG. 9.

Back to the description of the sequence diagram.

In step S110, in response to the user pressing the STORE button 805, then in step S1111, the setting is stored, and the transmission destination setting 704 on the scan screen is updated and displayed. In step S1112, in response to the user pressing the scan button 705, then in step S1113, the MFP 110 performs scanning based on the scan setting set in the scan setting 703. In step S1114, in response the user pressing the transmission button 706, then in step S115, the MFP 110 transmits the scan data together with the transmission destination information specified in the transmission destination setting 704 to the MFP cooperative server 120. In step S1116, the MFP cooperative server 120 generates a file from the scan data. In step S1117, the MFP cooperative server 120 transmits the generated file to the transmission destination specified by the transmission destination server 130.

<Partial Display Procedure for Transmission Destination Information>

FIG. 9 is a flowchart illustrating a processing procedure for the above described displaying of the transmission destination information on the scan screen 700 and the transmission destination setting screen 800 on the MFP 110. Execution of processing in the present procedure is started in response to displaying of the screen serving as a trigger. The present procedure is for displaying of one transmission destination information from among the transmission destination information to be displayed, and the processing is performed on each transmission destination information to be displayed.

The processing is described in detail below with reference to the flowchart in FIG. 9.

First, in step S901, the display control unit 421 acquires the transmission destination information to be displayed. The transmission destination information to be displayed is the default transmission destination information acquired from the MFP cooperative server 120 in step S104 or the transmission destination information selected or input by the user on the transmission destination setting screen 800.

In step S902, the display control unit 421 determines whether the acquired transmission destination information fits within the display area. In a case where the display control unit 421 determines that the transmission destination information fits within the display area (YES in step S902), the processing proceeds to step S903. In step S903, the transmission destination information is fully displayed. In a case where the display control unit 421 determines that the transmission destination information does not fit within the display area (NO in step S902), the processing proceeds to step S904. In step S904, the display control unit 421 determines whether the transmission destination type of the acquired transmission destination information is FOLDER or E-MAIL.

In the present exemplary embodiment, the display control unit 421 determines whether the transmission destination type is FOLDER or E-MAIL, based on the transmission destination type included in the transmission destination information acquired in step S1104, that is, based on information indicating the transmission destination type. Alternatively, the display control unit 421 determines whether the transmission destination type is FOLDER or the E-MAIL, based on information indicating the transmission destination type corresponding to the selected profile that is extracted from the transmission destination information collectively acquired for all profiles in step S1102. In a case where the information about the transmission destination service included in the transmission destination information is a storage service, the display control unit 421 may determine that the transmission destination type is FOLDER, and in a case where the information about the transmission destination service included in the transmission destination information is an e-mail service, the display control unit 421 may determine that the transmission destination type is E-MAIL. Alternatively, the character string in the transmission destination information is analyzed, and in a case where the character string includes a slash (/) or a backslash (\), the display control unit 421 may determine that the transmission destination type is FOLDER, and in a case where the character string includes an at sign (@), the display control unit 421 may determine that the transmission destination type is E-MAIL. Alternatively, the scan screen may be configured to display a plurality of transmission destinations, and the determination may be performed based on where a transmission destination is displayed. For example, in a case where a transmission destination is displayed in an area that displays the folder path, the display control unit 421 may determine that the transmission destination type is FOLDER, and in a case where a transmission destination is displayed in an area that displays an e-mail address, the display control unit 421 may determine that the transmission destination type is E-MAIL.

In step S904, in a case where display control unit 421 determines that the transmission destination type is FOLDER, the processing proceeds to step S905. In step S905, the display control unit 421 omits a beginning part of the character string to fit the character string within the display area and performs the partial display as illustrated in the transmission destination setting 704 in FIG. 7A. In other words, characters that do not fit within the display area when the folder path is aligned to the right margin of the display area are omitted, and partial display of the folder path is performed. In this process, ellipses ( . . . ) may be displayed on a left side end of the display area to indicate that a part of the character string is omitted. In step S904, in a case where the display control unit 421 determines that the transmission destination type is E-MAIL, in step S906, the display control unit 421 omits an end part of the character string to fit the character string within the display area and performs the partial display as illustrated in the transmission destination setting 704 in FIG. 7B. In other words, characters that do not fit within the display area when the e-mail address is aligned to the left margin of the display area are omitted, and the partial display is performed. In this process, ellipses ( . . . ) may be displayed on the right side end of the display area to indicate that a part of the character string is omitted. FIG. 10 is an example of an omission target management table 1000 that is managed by the display control unit 421 and stores an omission part corresponding to the transmission destination type. According to the present exemplary embodiment, attribute types including FOLDER and E-MAIL are registered in the omission target management table 1000. Then, FOLDER and E-MAIL are associated with omission part information, which is "beginning part omission" and "end part omission", respectively. In step S905 or S906, the omission part information corresponding to the determined transmission destination type is acquired from the omission target management table 1000, and the partial display is performed. According to the present exemplary embodiment, the transmission destination types of FOLDER and E-MAIL are described as examples, but the type is not limited. For example, a type of attribute information on metadata, such as not only a file name but also a document identification (ID), an address, and a person's name may be used for determination and partial display is performed with reference to the omission target management table 1000. A UI screen (not illustrated) on which the user can freely manage the omission target management table of these types may be disposed.

According to the present exemplary embodiment, partial display of a transmission destination of image data acquired by scanning using the scanner unit 222 is described. However, the present disclosure is not limited to this. For example, with respect to a facsimile document acquired through facsimile communication using the modem 223, control may be performed to perform partial display of a transmission destination to which the facsimile document is to be transferred.

Other Embodiments

The object of the present disclosure is also achieved by executing the following processing. That is, a storage medium storing program codes of software for realizing the functions of the above-described embodiments is supplied to a system or an apparatus, and a computer (or a CPU or an MPU) of the system or the apparatus reads the program codes stored in the storage medium. In this case, the program code itself read from the storage medium realizes the functions of the above-described embodiments, and the program code and the storage medium which stores the program code constitute the present disclosure.

An information processing apparatus according to the present disclosure omits, with regard to different types of transmission destinations, different parts of the transmission destinations in a case where transmission destination information does not fit within a predetermined area in displaying the transmission destination information, and performs partial display of the transmission destination.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-021396, filed Feb. 15, 2023, which is hereby incorporated by reference herein in its entirety.

What is claimed is:

1. An image processing apparatus equipped with a scanner and having a function of transmitting image data generated using the scanner to a folder, the image processing apparatus comprising:
a memory which stores a computer program; and
at least one processor which executes the computer program to perform a process which comprises:
displaying a screen including a display area for displaying information indicating a transmission destination of the image data and an area for receiving an instruction to transmit the image data to the transmission destination, and
wherein, in a case where a folder path specified as the transmission destination and having folder names arranged in order from an upper hierarchy to a target folder does not fit within the display area, the folder path is displayed in the display area in a format in which a beginning part of the folder path is omitted.

2. The image processing apparatus according to claim 1, wherein an end part of the folder path is displayed in the display area in a format in which the beginning part including a beginning of the folder path is omitted.

3. The image processing apparatus according to claim 1, wherein the folder path specifies a part of an area of a storage provided by a cloud service.

4. The image processing apparatus according to claim 1, wherein, in a case where the area for receiving an instruction to transmit the image data to the transmission destination receives the instruction, the image data is transmitted to the transmission destination displayed in the display area.

5. The image processing apparatus according to claim 1, wherein the screen including the display area further includes a preview area that displays the image data in preview.

6. The image processing apparatus according to claim 1, wherein the at least one processor further comprising transmitting image data generated using the scanner to an e-mail address,
wherein, in a case where an e-mail address specified as the transmission destination does not fit within the display area, the e-mail address is displayed in the display area in a format in which an end part of the e-mail address is omitted.

7. The image processing apparatus according to claim 6, wherein a beginning part of the e-mail address is displayed in the display area in a format in which the end part including an end of the e-mail address is omitted.

8. The image processing apparatus according to claim 6, wherein determination of whether a folder path indicating a storage location or an e-mail address is specified as the transmission destination is performed,
wherein, based on a result of the determination,
in a case where a folder path indicating a storage location is specified as the transmission destination, the folder path is displayed in the display area in a format in which a beginning part of the folder path is omitted based on a fact that the specified folder path having folder names arranged in order from an upper hierarchy to a target folder does not fully fit within the display area, and in a case where an e-mail address is specified as the transmission destination, the e-mail address is displayed in a format in which an end part of the e-mail address is omitted based on a fact that the specified e-mail address does not fully fit within the display area.

9. The image processing apparatus according to claim 8, wherein, based on a fact that a first symbol is included in information indicating the transmission destination to be displayed in the display area, it is determined that a folder path indicating a storage location is specified as the transmission destination, and wherein, based on a fact that a second symbol is included in the information indicating the transmission destination to be displayed in the display area, it is determined that an e-mail address is specified as the transmission destination.

10. The image processing apparatus according to claim 8, wherein the image processing apparatus receives selection of a button corresponding to a service of a transmission destination to which the image data is transmitted, and wherein, in a case where the service associated with the selected button is a storage service, it is determined that a folder path indicating a storage location is specified as the transmission destination, and in a case where the service associated with the selected button is an e-mail service, it is determined that an e-mail address is specified as the transmission destination.

11. The image processing apparatus according to claim 10, wherein the image processing apparatus further acquires information set in association with the selected button, wherein the information set in association with the button includes information indicating a transmission destination to be initially displayed in the display area, and wherein the information indicating the transmission destination to be initially displayed is initially displayed in the display area.

12. The image processing apparatus according to claim 10, wherein the at least one processor further comprising displaying, based on selection of the display area by a user, a setting screen for setting a transmission destination of the image data.

13. The image processing apparatus according to claim 12, wherein an option that is able to be specified as a transmission destination of the service associated with the selected button is displayed on the setting screen for setting the transmission destination.

14. The image processing apparatus according to claim 13, wherein a folder of an external storage service and an e-mail address with a history of transmission from the image processing apparatus are displayed on the setting screen as options that is able to be specified as the transmission destinations.

15. A method for controlling an image processing apparatus equipped with a scanner and having a function of transmitting image data generated using the scanner to a folder, the method comprising:

displaying a screen including a display area for displaying information indicating a transmission destination of the image data and an area for receiving an instruction to transmit the image data to the transmission destination, and wherein, in a case where a folder path specified as the transmission destination and having folder names arranged in order from an upper hierarchy to a target folder does not fit within the display area, the folder path is displayed in the display area in a format in which a beginning part of the folder path is omitted.

16. A non-transitory computer-readable storage medium storing a computer program for executing a method for controlling an image processing apparatus equipped with a scanner and having a function of transmitting image data generated using the scanner to a folder, the method comprising:

displaying a screen including a display area for displaying information indicating a transmission destination of the image data and an area for receiving an instruction to transmit the image data to the transmission destination, and wherein, in a case where a folder path specified as the transmission destination and having folder names arranged in order from an upper hierarchy to a target folder does not fit within the display area, the folder path is displayed in the display area in a format in which a beginning part of the folder path is omitted.

* * * * *